United States Patent
Patz et al.

(10) Patent No.: US 7,228,185 B2
(45) Date of Patent: Jun. 5, 2007

(54) METHOD FOR CONTROLLING AND/OR REGULATING INDUSTRIAL PROCESSES

(75) Inventors: Kai-Uwe Patz, Wuerzburg (DE); Juergen Lorasch, Lohr am Main (DE); Frank Mueller, Floersbachtal (DE); Georg Kuehnlein, Hammelburg (DE); Reinhard Brunner, Dresden (DE); Matthias Ihling, Dresden (DE)

(73) Assignee: Rexroth Indramat GmbH, Lohr am Main (DE)

( * ) Notice: Subject to any disclaimer, the term of this patent is extended or adjusted under 35 U.S.C. 154(b) by 289 days.

(21) Appl. No.: 10/489,276

(22) PCT Filed: Sep. 7, 2002

(86) PCT No.: PCT/DE02/03324

§ 371 (c)(1),
(2), (4) Date: Aug. 6, 2004

(87) PCT Pub. No.: WO03/023527

PCT Pub. Date: Mar. 20, 2003

(65) Prior Publication Data

US 2004/0249476 A1 Dec. 9, 2004

(30) Foreign Application Priority Data

Sep. 12, 2001 (DE) .................................. 101 44 987

(51) Int. Cl.
- *G05B 11/01* (2006.01)
- *G05B 19/18* (2006.01)
- *G06F 9/46* (2006.01)

(52) U.S. Cl. .................. 700/19; 700/2; 700/7; 700/14; 700/20; 718/100; 718/104; 718/106

(58) Field of Classification Search .................. 700/19, 700/20, 18, 159, 1–2, 7, 11, 14; 707/102; 702/183; 718/100, 106, 104
See application file for complete search history.

(56) References Cited

U.S. PATENT DOCUMENTS 3,969,723 A * 7/1976 Kennicott ..................... 700/83
4,389,706 A * 6/1983 Gomola et al. ................. 700/1

(Continued)

FOREIGN PATENT DOCUMENTS

EP          0 372 726 A      6/1990

(Continued)

*Primary Examiner*—Ramesh Patel
(74) *Attorney, Agent, or Firm*—Michael J. Striker

(57) ABSTRACT

In a method for controlling and/or regulating industrial processes (1, 20), a standard operating system (3) with a real-time module or a real-time operating system is implemented on a hardware platform (2) and simultaneously at least two real-time applications (7, 8) with characteristic real-time requirements are active under the real-time module or under the real-time operating system. In particular, simultaneously with the real-time applications (7, 8), at least one non-real-time application (5) is active, and the real-time requirements of each real-time application (7, 8) are predetermined on the specification of the applicable industrial processes (1). Each real-time application (7, 8), by means of an allocation module (4) running on the hardware platform (2), is allocated a maximally available component (9, 10) of a maximally available real-time component (11) of one operating cycle (13).

12 Claims, 4 Drawing Sheets

U.S. PATENT DOCUMENTS

| | | | | |
|---|---|---|---|---|
| 5,940,293 A | * | 8/1999 | Schwenke et al. | 700/61 |
| 6,108,662 A | * | 8/2000 | Hoskins et al. | 707/102 |
| 6,154,684 A | * | 11/2000 | Schwenke et al. | 700/159 |
| 6,157,864 A | * | 12/2000 | Schwenke et al. | 700/79 |
| 6,226,559 B1 | | 5/2001 | Salazar | |
| 6,553,268 B1 | * | 4/2003 | Schwenke et al. | 700/18 |
| 6,556,950 B1 | * | 4/2003 | Schwenke et al. | 702/183 |
| 2002/0120921 A1 | * | 8/2002 | Coburn et al. | 717/140 |
| 2004/0128120 A1 | * | 7/2004 | Coburn et al. | 703/26 |
| 2005/0278670 A1 | * | 12/2005 | Brooks et al. | 716/5 |

FOREIGN PATENT DOCUMENTS

| | | |
|---|---|---|
| EP | 0 903 654 A | 3/1999 |
| WO | 96 33450 A | 10/1996 |

* cited by examiner

METHOD FOR CONTROLLING AND/OR REGULATING INDUSTRIAL PROCESSES

CROSS-REFERENCE

The invention described and claimed hereinbelow is also described in PCT/DE 02/03324, filed on Sep. 7, 2002 and DE 101 44 987.9, filed Sep. 12, 2001. This German Patent Application, whose subject matter is incorporated here by reference, provides the basis for a claim of priority of invention under 35 U.S.C. 119 (a)–(d).

BACKGROUND OF THE INVENTION

The invention relates to a method for controlling and/or regulating industrial processes, which runs on a hardware platform. This hardware platform can for instance be a PC, in particular an HMI (Human Machine Interface), or an industrial PC. For implementing the real-time capability, in addition to the standard operating system (which as a rule is not capable of real-time operation), a real-time module is also present on the hardware platform, for the controlling and/or regulating operations in real time, or else a real-time operating system is implemented on the hardware platform.

On a hardware platform, non-real-time applications can also run or be active—along with or under the real-time module or the real-time operating system. These non-real-time applications are active simultaneously with the aforementioned module or real-time operating system. This means that the non-real-time application should be allocated a suitable running time, that is, in particular, a component of an operating system cycle.

To that end, it is known for the operating cycle of a standard operating system to be subdivided by an interrupt controller, which for instance acts on the interrupt scheduler, into a real-time component and a non-real-time component. Furthermore, it is known for the time components of the operating cycle that occur in real time and non-real time respectively, to be fixedly allocated in the operating cycle.

Such a method is comparatively inflexible, since it cannot be adapted in a consistent system to all the real-time requirements that are typically required for industrial processes, especially real-time requirements that—depending on the process to be controlled/regulated—differ from one another. In particular, in the aforementioned method, the respective control/regulation of different industrial processes for using the various real-time applications is burdened by capacity requirements. Another factor is that the existing capacities of the controlling and/or regulating systems are poorly utilized, especially in complex processes of the kind that typically occur in industrial manufacture and/or machining.

SUMMARY OF THE INVENTION

It is therefore the object of the present invention, with respect to all the control and/or regulation requirements that occur in industrial processes, to bring about better utilization of capacity and in particular better efficiency of the control and/or regulating systems involved, in which nevertheless simple execution and in particular operation and control of the method and intervention into the method by the user are possible.

The invention offers a method which is adapted to modern control and/or regulation requirements and which with respect to the control and/or regulating systems involved offers higher-order task management, thus relieving the control and/or regulating systems of such proprietary task management jobs.

This advantage is attained by providing that a plurality of real-time applications, at least two of them, with—preferably for each of them—characteristic real-time requirements are active under the real-time module or under the real-time operating system. The real-time requirements of each real-time application are predetermined by the industrial processes to be controlled and/or regulated. For machining material in machine tools, for instance, as a rule greater real-time requirements, that is, in particular, shorter time constants and greater time components of the requisite CPU execution time with respect to the application exist than for instance in simple transfer or detection tasks, such as end switches and so forth.

These requirements that typically occur in industrial processes, such as machining processes, for instance in machine tools, or production processes, for instance in automation technology, or in handling, in printing presses, or in machine tools and packaging machines, that are made of a control method are flexibly met by the invention. The actual controlling and/or regulating methods, such as block machining in a Numerical Control, or an NC, are relieved of such task management jobs, and as a result greater efficiency is achieved. Regardless of changes in implementation of the applications of the individual real-time applications, the behavior of the particular unchanged real-time application or real-time applications remains deterministic and unaffected.

In addition, for a specific industrial process in a machine or on a production line, for instance, the respective characteristic real-time requirements in the method can be duplicated more precisely and flexibly; this is because an allocation module is present, which in each case in a process-oriented and individual way allocates each of the real-time applications a suitable maximum available time (component) of a maximum available real-time component of an operating cycle. As a result, substantially more-precise allocation of the computation power, and in particular the applicable execution time available for the particular real-time application in an operating cycle, becomes possible. Hence—either statically or dynamically; see below—the particular system can be modeled substantially more precisely, and the applicable requirements for performance of the system can be met substantially better and more precisely. Because of the process-oriented, more-precise modelling of the computation time distribution with regard to the various real-time applications, the existing computer power can be utilized more efficiently.

Preferred features of the present invention are recited in the dependent claims.

The allocation module can, however, also keep the assignment of the components variable during the running time of the real-time applications, so that for instance by manual input by a user, the appropriate allocation can be changed. This enables an adaptation—even afterward—of the component allocation of the real-time applications among one another.

The maximally available component of the real-time applications can likewise be automatically allocated dynamically as needed during the running time of the real-time applications. Thus such a method reacts automatically to changes in requirements, particularly in terms of the need for computation time of the various real-time applications. This can occur for instance if production conditions change, such as if the production speed is increased or reduced, and so forth.

Most of the requirements that occur in such industrial processes are already covered by the invention if one real-time application pertaining to Programmable Logic Control (PLC) functionality/PLC subprocess and one real-time application pertaining to NC functionality/NC subprocess are provided. The invention has recognized the fact that the various requirements, in particular real-time requirements, of PLC functionalities and NC functionalities make a duplication in the fundamental task management extremely advantageous. This allocation can be done as needed and in process-oriented fashion, so that a greater proportion of the NC time need not necessarily always be provided. Depending on the configuration of the applicable system or system part, the components can vary, so that for instance a greater time component can be provided for the fundamental PLC functionality.

As the standard operating system, an embedded operating system can for instance be provided. In that case, the applicable functions and modules (real-time module, allocation module) can be implemented in the standard operating system.

The allocation can also be done separately, that is, in remote fashion, with respect to the various equipment for controlling and/or regulating purposes. Then the applicable item of equipment is relieved of the software and/or hardware for the allocation according to the invention, and the separate Automatic Data Processing, or ADP, system need merely be connected to the hardware platform, in particular via a direct connection by means of an interface, or via a network connection.

BRIEF DESCRIPTION OF THE DRAWINGS

The invention will be described in further detail in terms of exemplary embodiments shown in the drawings. Shown are.

Figure 1:
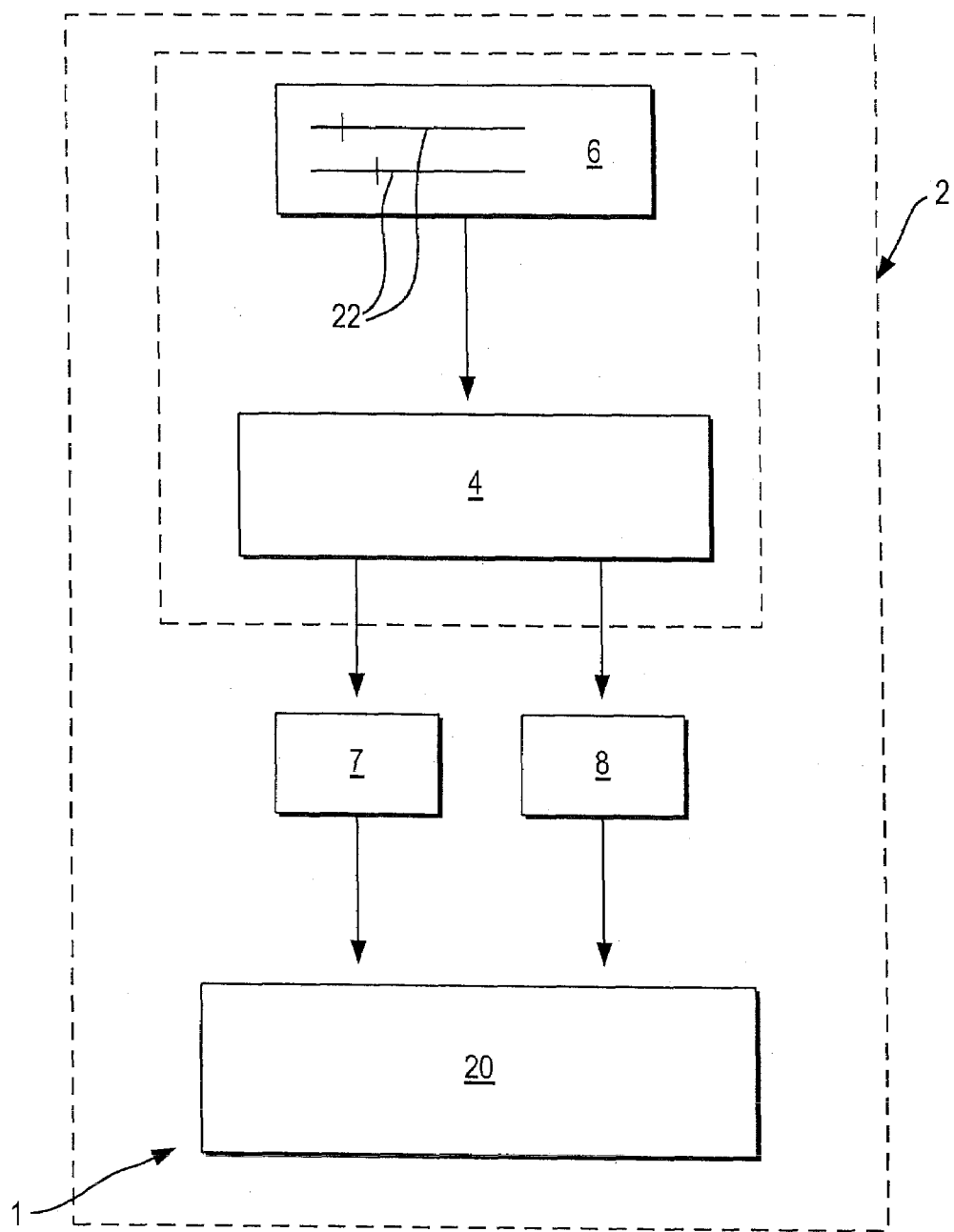
FIG. 1, a schematic illustration of function units essential to the invention, which cooperate in such a way that a controlling and/or regulating method according to the invention for an industrial process results.

Unless otherwise noted below, all the reference numerals always apply to all the drawings.

DETAILED DESCRIPTION OF THE PREFERRED EMBODIMENTS

FIG. 1 shows the cooperation of function units that are essential to the invention for performing the method for controlling and/or regulating industrial processes, as described above. For the sake of simplicity, the illustration is merely symbolic. The industrial process 1 to be regulated has a subprocess 20, which here is controlled and/or regulated by means of the method of the invention. What is essential is that the subprocess 20 to be regulated is composed of further subprocesses (not shown individually here), and the further subprocesses make the use of two different real-time applications necessary or useful. For instance, for simple handling tasks, such as the delivery of workpieces or conveying flat material, a PLC real-time application can be employed. In addition, machining of workpieces can for instance be needed, which requires a Computer Numerical Control (CNC)/NC real-time application. This can for instance be a machine tool part. Each of the real-time applications 7, 8 has characteristic real-time requirements—based on the processes to be controlled/regulated—which are suitably taken into account by the method of the invention. Thus real-time requirements are defined by the definitive time constants of the processes; this also includes the precision of instant detection and of starting and stop times as well as the appropriate time components that are allocated according to the invention and are required. An adjustment module 6 and an allocation module 4 are combined here into one functional unit. The adjustment—for instance manually—by the adjustment module 6 takes place by means of the linear movable tuning knob 22. Once the distribution of the time components (see below) has been performed by an adjustment module 6, the adjustment module 6 communicates with the allocation module 4. The allocation module 4 receives the time specifications and thereupon allocates each of the real-time applications 7, 8 an appropriate maximum running time. With this running time, the subprocess 20 is controlled/regulated, so that an individual time allocation takes place which is optimal in each case and improved over the prior art and which suitably addresses the characteristic of the (in particular different) real-time requirements. The real-time requirements of the different real-time applications 7, 8 can also, in practical terms, be the same.

Figure 2:
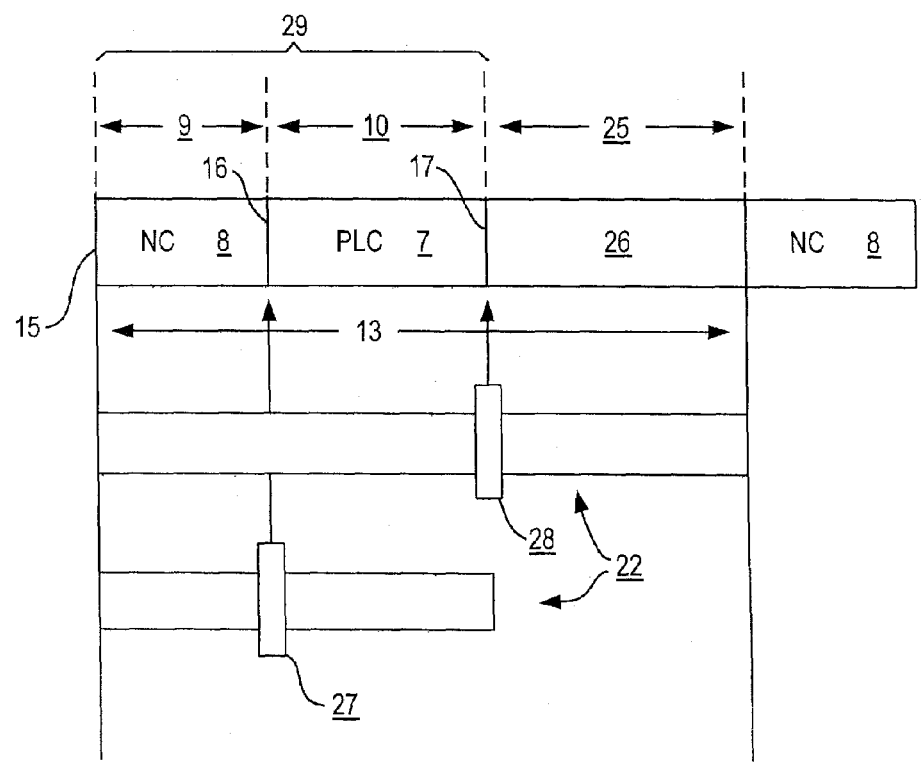
FIG. 2, a schematic illustration of the allocation method of the present invention in terms of an excerpt from a sequence of operating cycles.
Figure 3:
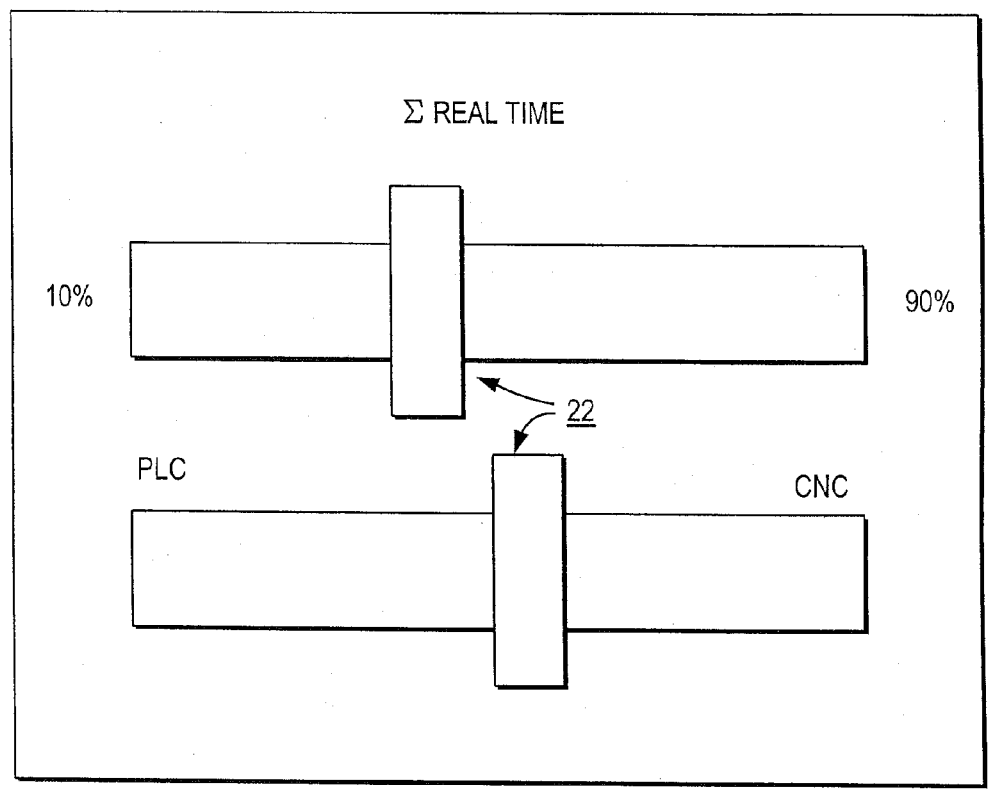
FIG. 3, a linear-gate controller configuration for the allocation according to the invention, which differs from that of FIG. 3 in the configuration of the linear-gate controllers.

FIG. 2 schematically shows one possibility of the allocation according to the invention of time components 9, 10 of an operating cycle 13. The duration of one operating cycle 13 is selected such that it can be administered in standard fashion by the hardware platform 2 and suitably meets the timing requirements and cycle times of the various real-time requirements. The real-time component 29 of an operating cycle 13 is predetermined—as shown symbolically here—by the position of the linear-gate controller 28 for the real-time/non-real-time distribution. The component that is fundamentally available for the real-time applications 7, 8 is thus defined. For the sake of an instructive illustration, the adjustment range for the linear-gate controller 27 for the distribution of the cycle time among the real-time applications 7, 8 is predetermined by the position of the linear-gate controller 28. In accordance with the position shown, the NC time component 9 is available for the real-time application 8 (in this case an NC application), and the corresponding time component 10 is available for the PLC real-time application 7. The time components 9, 10 are different here, depending on the specification of the process requirements or of the various control and/or regulation requirements. A practically optimal or advantageous distribution of the corresponding durations or cycle times can be ascertained in advance for instance by means of a test run or ascertained by means of a simulation of the applicable system that executes the application subprocess 20. Another possible way of simple operation is shown in FIG. 3. Here, a linear-gate controller designated by the character Sigma (meaning sum) real time is provided for the distribution between real-time and non-real-time applications 7, 8. This linear-gate controller specifies the adjustment for the real-time component 29 of an operating cycle 13. This real-time component has an upper limit and a lower limit, in this case 10 and 90%, respectively.

The lower linear-gate controller serves to distribute the time components 9, 10 of the individual real-time applications 7, 8 of the real-time component 29, specified by the upper linear-gate controller, of an operating cycle 13.

Figure 4:
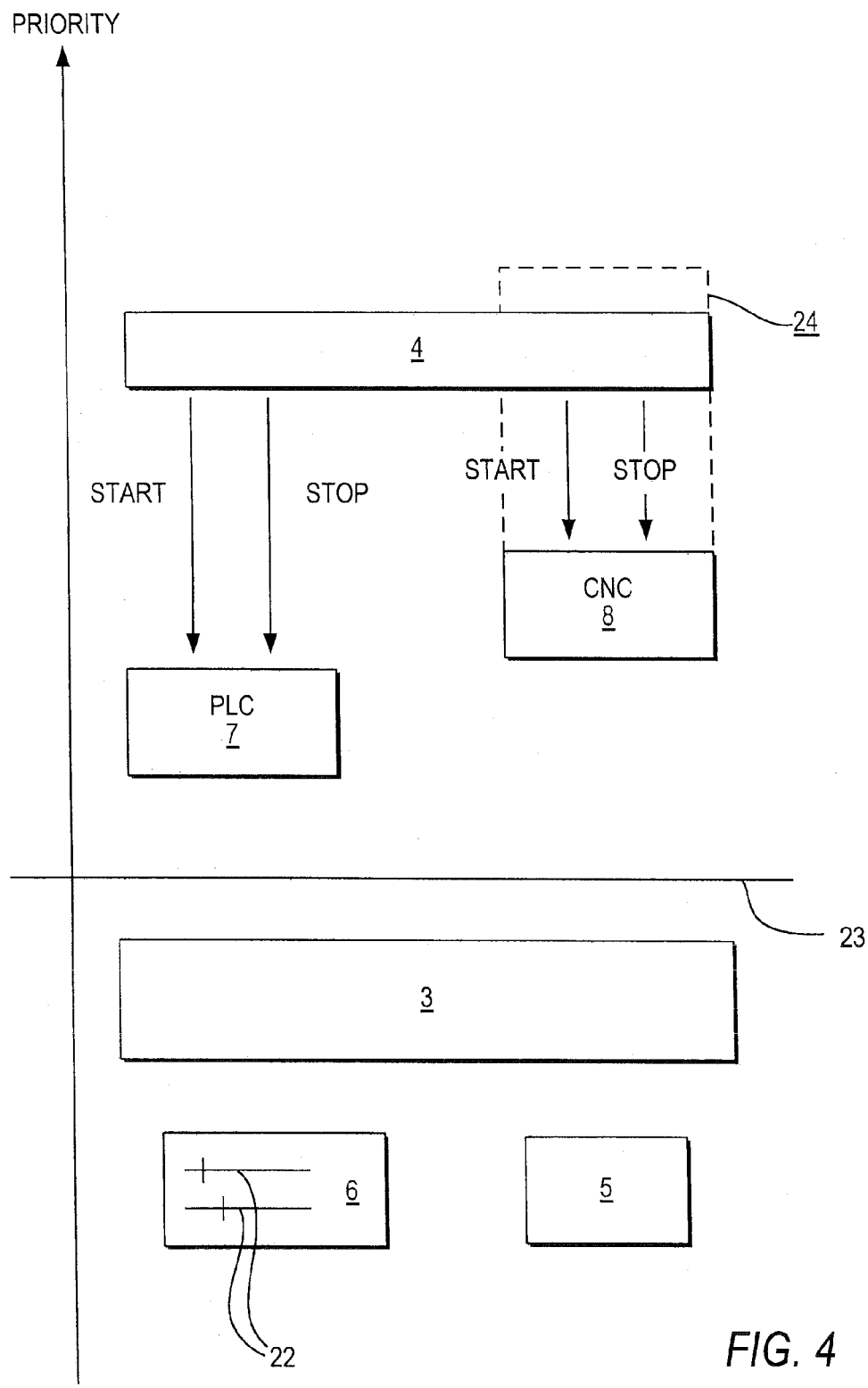
FIG. 4, a priority diagram of the non-real-time tasks and real-time tasks, with appropriate arrangement of the standard operating system and of the allocation module.

Finally, FIG. 4 shows a classification of the applicable modules or function units on the basis of their priority. The boundary 23 between non-real-time priority and real-time priority is indicated only schematically here. The standard operating system 3 is located on the non-real-time plane. The adjustment—for instance manually—by the adjustment module 6 by means of the linear movable tuning knob 22 likewise takes place on the non-real-time plane. In addition, non-real-time applications 5 can also run under the standard operating system 3. The PLC real-time applications 7 and the CNC application 8 are assigned real-time priority. In particular applications, it can happen that the priority of the real-time application 8 (CNC) is higher than the priority of the allocation module 4. As a rule, however, the allocation module 4 has a higher priority than the real-time applications 7, 8. This serves to preserve a deterministic behavior of the control and/or regulation. The allocation module 4 generates appropriate starting and stop signals for the real-time applications 7, 8 at the appropriate instants 14, 15, 16 (see FIG. 2), which cyclically in an operating cycle 13 allocate the appropriate starting and stop times for the applicable applications.

LIST OF REFERENCE NUMERALS

1 Industrial process (schematic)
2 Hardware platform
3 Standard operating system
4 Allocation module
5 non-real-time application
6 Adjustment module
7 SPS real-time application
8 NC real-time applications
9 NC time component
10 SPS time component
13 Duration of one operating cycle
14 Starting time of an operating cycle, corresponding to NC starting time
15 NC stop time corresponding to SPS starting time
16 SPS stop time corresponding to non-real-time starting time
20 Subprocess of the industrial process
21 Non-real-time cycle
22 Linear-gate controller
23 Non-real-time/real-time priority limit
24 Possible priority range
25 Non-real-time component
26 Non-real-time component
27 Linear-gate controller for real-time distribution
28 Linear-gate controller for real-time/non-real-time distribution
29 Real-time component

The invention claimed is:

1. A method for controlling or regulating industrial processes (1, 20), comprising the following steps:
    implementing a standard operating system (3) with a real-time module or a real-time operating system on a hardware platform;
    operating simultaneously at least two real-time applications (7, 8) with characteristic real-time requirements under the real-time module or under the real-time operating system;
    operating simultaneously with the real-time applications (7, 8), at least one non-real-time application (5);
    predetermining the real-time requirements of each real-time application (7, 8) on the specification of the applicable industrial processes (1); and
    allocating to each real-time application (7, 8), by means of an allocation module (4) running on the hardware platform (2), a maximally available component (9, 10) of a maximally available real-time component (11) of one operating cycle (13).

2. The method of claim 1, wherein an adjustable, static assignment of the maximally available component (9, 10) of each real-time application (7, 8) is made.

3. The method of claim 1, wherein on the basis of a test run or a plurality of test runs, the maximally available component (9, 10) is ascertained adaptively.

4. The method of claim 1, wherein allocation of the components (9, 10) is done during the running time of the real-time applications (7, 8) by manual input by a user.

5. The method of claim 1, wherein the maximally available component (9, 10) of the real-time applications (7, 8) is automatically allocated dynamically as needed during a running time of the real-time applications (7, 8).

6. The method of claim 1, wherein one real-time application (7) pertaining to Programmable Logic Control (PLC) functionality/subprocess and one real-time application (8) pertaining to Numerical Control (NC)I functionality/subprocess are each provided.

7. The method of claim 1, wherein as the standard operating system (3), a hardware-embedded operating system is provided.

8. The method of claim 1, wherein the allocation of the maximally available components (9, 10) is effected via an Automatic Data Processing (ADP) system that is separate with respect to the hardware platform (2) with the course of the real-time applications (7, 8) via a direct connection by means of an interface or via a network connection.

9. The method of claim 1, wherein the operating cycles (12) are synchronized with an external hardware event.

10. The method of claim 1, wherein definitive time intervals (9, 10, 11, 13) and/or definitive instants (15, 16, 17) for applicable cycles (13) and cycle components are specified by a timer.

11. The method of claim 9, wherein the time intervals (9, 10, 11, 13) and instants (15, 16, 17) are specified by means of cyclical polling of the timer/operating system timer by counting down a suitable number of time signals.

12. The method of claim 10, wherein the timer is an operating system timer.

* * * * *